United States Patent [19]

Malik et al.

[11] Patent Number: 6,023,701
[45] Date of Patent: Feb. 8, 2000

[54] SKELETON PAGE RETRIEVAL MODE FOR WEB NAVIGATION

[75] Inventors: Nadeem Malik, Austin, Tex.; Chandrasekhar Narayanaswami, Wilton, Conn.; Avijit Saha, Austin, Tex.

[73] Assignee: International Business Machines Corporation, Armonk, N.Y.

[21] Appl. No.: 08/937,452

[22] Filed: Sep. 25, 1997

[51] Int. Cl.[7] .................................................. G06F 17/30
[52] U.S. Cl. ........................... 707/10; 707/104; 709/201; 709/217; 709/219
[58] Field of Search ................................. 707/10, 104, 1, 707/219; 395/200.31, 200.47, 200.62, 200.49; 709/201, 217

[56] References Cited

U.S. PATENT DOCUMENTS

| | | | |
|---|---|---|---|
| 4,982,344 | 1/1991 | Jordan | 364/521 |
| 5,175,848 | 12/1992 | Dysart et al. | 395/600 |
| 5,339,391 | 8/1994 | Wroblewski et al. | 395/157 |
| 5,499,369 | 3/1996 | Atkinson | 395/650 |
| 5,546,517 | 8/1996 | Marks et al. | 395/145 |
| 5,557,722 | 9/1996 | DeRose et al. | 395/148 |
| 5,572,643 | 11/1996 | Judson | 395/793 |
| 5,727,129 | 3/1998 | Barret et al. | 395/12 |
| 5,737,599 | 4/1998 | Rowe et al. | 707/104 |
| 5,737,619 | 4/1998 | Judson | 395/761 |
| 5,742,768 | 4/1998 | Gennaro et al. | 395/200.33 |
| 5,752,022 | 5/1998 | Chiu et al. | 707/10 |
| 5,760,771 | 6/1998 | Blonder et al. | 345/336 |
| 5,761,436 | 6/1998 | Nielsen | 395/200.75 |
| 5,781,785 | 7/1998 | Rowe et al. | 395/774 |
| 5,784,058 | 7/1998 | LaStrange et al. | 345/340 |
| 5,796,393 | 8/1998 | MacNaughton et al. | 345/392 |

*Primary Examiner*—Thomas G. Black
*Assistant Examiner*—Frantz Coby
*Attorney, Agent, or Firm*—Robert V. Wilder; Volel Emile

[57] ABSTRACT

A method and implementing computer system is provided in which an internet or web network user may invoke a hyperlink or site link listing mode to retrieve only the hyperlinks available on selected target pages rather than retrieving the entire text and graphics of the target pages. The network assembles only the available hyperlinks and associated activation code segments for presentation to the user. The user may then select from the presented hyperlinks, the most appropriate hyperlink or path in pursuit of the user's particular search goals. The hyperlink access methodology enables faster navigation through selected and more direct paths to particular search goals by selectively assembling and displaying listings of only hyperlinks of designated target pages rather than entire page presentations. The user may designate and change the number of levels to be searched for hyperlinks, and displays are presented and organized so as to enable a user to quickly focus upon the sites most directly related to the user's search goals while requiring only minimal network usage time and reducing network traffic. The designated path through the chosen sites may be saved as a bookmarks for future reference and access.

10 Claims, 7 Drawing Sheets

SKELETON PAGE RETRIEVAL MODE FOR WEB NAVIGATION

FIELD OF THE INVENTION

The present invention relates generally to information processing systems and more particularly to an improved methodology and implementation for quickly locating sites of interest in a network system.

BACKGROUND OF THE INVENTION

As computer systems and networked computer systems proliferate, information access time becomes more critical. For many reasons, access time to information databases has a tendency to increase even with frequent equipment upgrades and technology advances. This tendency is apparent in mostly all database accesses which involve telecommunications links and is especially visible to the growing number of users of the Internet and worldwide web applications especially where extensive graphics are implemented.

In the internet or "worldwide web" network, a user is able to designate an address of a site or target page where the user desires to "go". The user then enters the selected site and the target page or site home page will be displayed on the user's display screen. In general, target pages with a great deal of graphics content, or even very large text-only pages will take a relatively long period of time to download to a user's terminal. During the interim time period before the target page is displayed, many channels of the network may be "tied-up" in retrieving and forwarding the requested page and information to the user's terminal. This process is not only relatively slow for the user, but it also ties-up the network to some extent, and slows down the same process for other users of the network.

Moreover, in many cases, when the target screen is displayed, it may not present the anticipated or sought after information and the user will then have to designate another target address for access. As hereinbefore noted, when the retrieved page contains a great amount of colorful and intricate graphics or sound files for example, the retrieval process takes a relatively long period of time. This is true because of the great amount of data and parameters that are needed to specify a color graphics display or sound output compared to a textual only display. Further, this process is not only a slow process for the user to endure, but the process also slows down the entire network by unnecessarily tying-up network channels which could have been used by other network subscribers. This disadvantage in search or access protocol is even more apparent at "rush hour" times when there are many millions of subscribers using the network at the same time.

In most applications today, target pages contain "links" to other pages which are related in some respect to the target page or the subject matter of the target page. These "links" are typically observed as a grouping of a few words, which are usually descriptive of the "linked" page to which access is offered. These links are sometimes referred to as "hyperlinks" and the context in which they are presented is referred to as "hypertext". The hyperlinks are generally displayed in bold type and underscored, and may be displayed in a different color, so that a user may easily locate the links on a page which otherwise may be filled with text. A user may "go" directly to one of the displayed linked pages simply by moving a cursor device such as a mouse device to point to an active screen area in which the "hyperlink" is presented within the "hypertext" and "clicking" on a selected enter button on the mouse device.

While the link methodology helps to speed-up a search to some degree vis-a-vis keying-in a new location every time a user desires to move to a new page, the process is still relatively slow. Whenever a hyperlink is selected and "clicked" on, the entire page will be retrieved including all of the graphics and text and graphics-related parameter specification that is necessary. It should also be noted that in many network searches or "net surfing" sessions, a user may actually be distracted by this process since so many aspects other than the particular aspect sought to be explored by the user will be presented on the displayed pages. Typically the user must read through all of the text and "hypertext" including the displayed "hyperlinks" within the text, to determine which hyperlink will best suit the user's needs. In applications where there are a great many hyperlinks presented, especially where there is more than one page of content at the selected site, a user may choose a hyperlink which appears early in the presentation or on the first screen of a page site not knowing that there are more appropriate hyperlinks presented in subsequent screens or pages at the site. Thus, there is a need for an improved methodology and implementing network system which enables a more efficient search protocol and requires a reduced amount of network usage time to accomplish.

SUMMARY OF THE INVENTION

A method and implementing apparatus is provided in which a network user may invoke a special mode such as a hyperlink or site link listing mode to retrieve only the hyperlinks available on a target page. In other applications, text only retrieval without hyperlink retrieval may be selected. In the hyperlink retrieval embodiment, the network assembles only the available hyperlinks for presentation to the user. The user may then select from the presented hyperlinks, the most appropriate hyperlink or path in pursuit of the user's particular search goals. The hyperlink access methodology enables faster navigation through selected and more direct paths to particular search goals by selectively assembling and displaying listings of only hyperlinks of designated target pages rather than entire page presentations. The user may designate and change the number of levels to be searched for hyperlinks, and displays are presented and organized so as to enable a user to quickly focus upon the sites most directly related to the user's search goals while requiring only minimal network usage time. The designated path through the chosen sites may be saved as a bookmarks for future reference and access.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
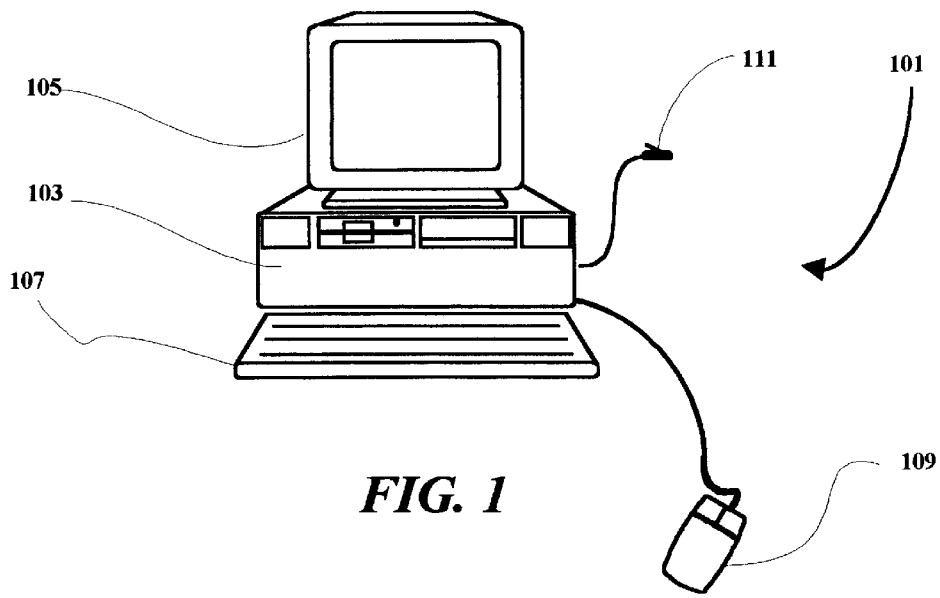
FIG. 1 is a diagram of a computer system in which the present invention may be implemented.

With reference to FIG. 1, the various methods discussed herein may be implemented within a typical computer system 101 which may include a workstation or personal computer. In general, an implementing computer system may include a plurality of processors in a multi-bus system in a network of similar systems. However, since the workstation or computer system 101 implementing the present invention in an exemplary embodiment, is generally known in the art and composed of electronic components and circuits which are also generally known to those skilled in the art, circuit details beyond those shown in FIG. 1, are not specified to any greater extent than that considered necessary as illustrated, for the understanding and appreciation of the underlying concepts of the present invention and in order not to obfuscate or distract from the teachings of the present invention.

In FIG. 1, the computer system includes a processor unit 103 which is typically arranged for housing a processor circuit along with other component devices and subsystems of the computer system 101. The computer system 101 also includes a monitor unit 105, a keyboard 107 and a mouse or pointing device 109, which are all interconnected with the computer system illustrated. Also shown is a connector 111 which is arranged for connecting a modem within the computer system to a communication line such as a telephone line in the present example. The present invention may also be implemented in a cellular system in which case the connector 111 would not be required.

Figure 2:
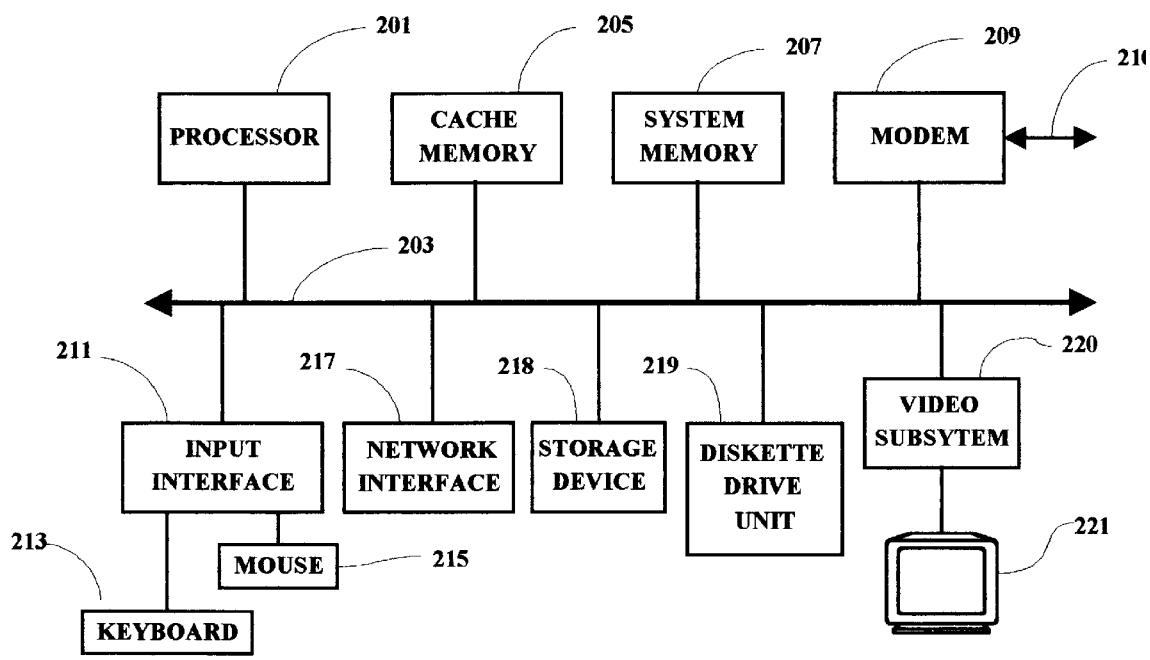
FIG. 2 is a simplified schematic diagram showing selected components and subsystems of the computer system illustrated in FIG. 1.

Several of the major components of the system 101 are illustrated in FIG. 2. A processor circuit 201 is connected to a system bus 203 which may be any host system bus. It is noted that the processing methodology disclosed herein will apply to many different bus and/or network configurations. A cache memory device 205, and a system memory unit are also connected to the bus 203. A modem 209 is arranged for connection 210 to a communication line, such as a telephone line, through a connector 111 (FIG. 1). The modem 209, in the present example, selectively enables the computer system 101 to establish a communication link and initiate communication with another computer system, or network or database server.

The system bus 203 is also connected through an input interface circuit 211 to a keyboard 213 and a mouse or pointing device 215. The bus 203 is also coupled to a network interface subsystem 217 and a diskette drive unit 219. A video subsystem 220, which may include a graphics subsystem, is connected to a display device 221. A storage device 218, which may comprise a hard drive unit, is also coupled to the bus 203. The diskette drive unit provides a means by which individual diskette programs may be loaded on to the hard drive, or accessed directly, for selective execution by the computer system 101. As is well known, program diskettes containing application programs represented by magnetic indicia on the diskette, may be read from the diskette drive, and the computer system is selectively operable to read such magnetic indicia and create program signals. Such program signals are selectively effective to cause the computer system to present displays on the screen of a display device and respond to user inputs in accordance with the functional flow of the application program on the diskette.

In running an Internet access program or browser program on the computer system 101, the access program is typically stored in the storage device 218 and either selectively or automatically, partially or totally, loaded into the system memory 207 when the system is initially powered-on, or at a later time if so desired by a user. The browser is selectively operable to access and execute a site selection program, as herein described, either directly from a diskette in the diskette drive unit 219 or directly from a copy of the site selection program stored on the hard drive unit 218. As a program is running, either a portion of the program or the entire program may be loaded into the system memory 207 and/or the system cache memory 205. Depending on specific program design, the system may store any information accessed from a database in the storage unit 218, the cache memory 205, the system memory 207 or directly from a diskette loaded into the diskette drive 219. Assuming a user has started-up the system, and is actively running an Internet program from memory, a series of screens will be displayed to the user on the display device 221. Each screen typically has one or more selections for the user to make in navigating through the program. In general, a user will make selections from a display screen using the keyboard 213 or the mouse or pointer device 215. In an Internet operating program, the selections made by the user will determine "where" the user "goes", i.e. to what "site", and also, in some cases, the communications link or the path taken to get to the site selected.

Figure 3:
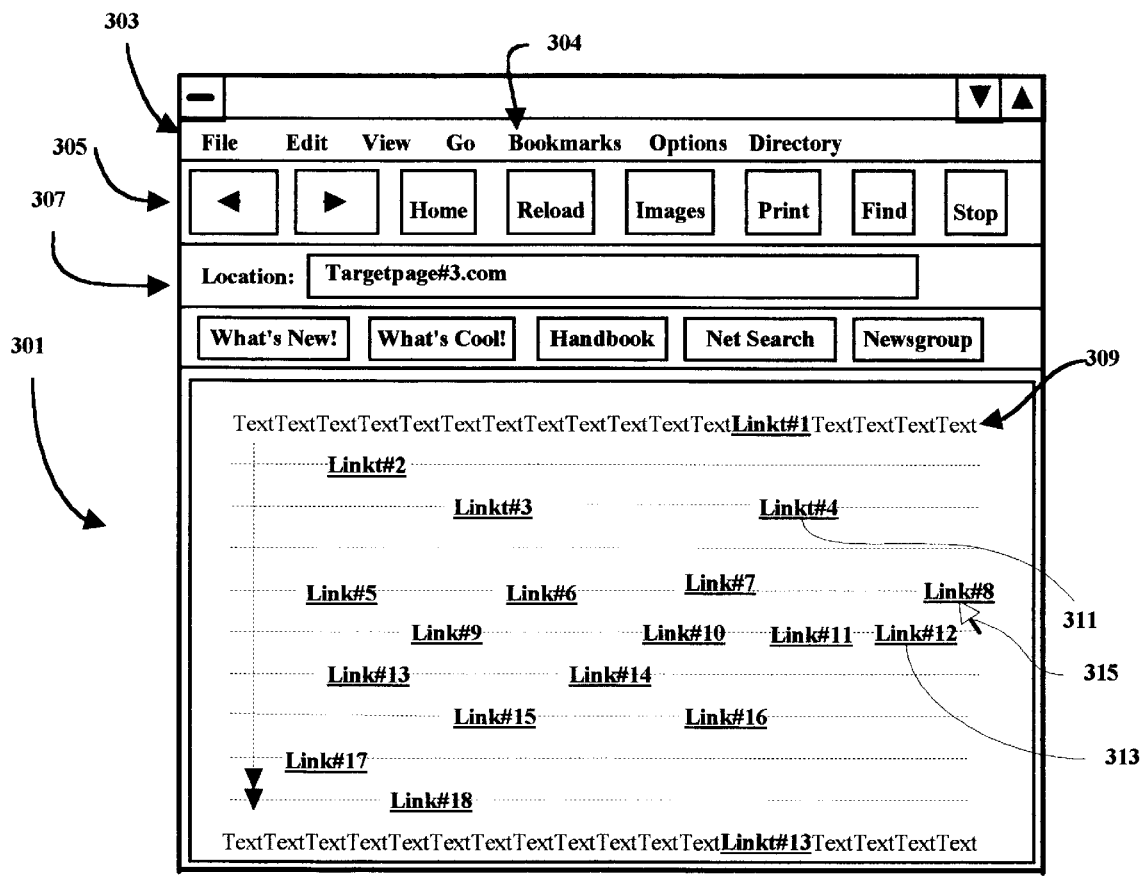
FIG. 3 is an illustration of an exemplary display screen of a typical target page for reference in explaining the present invention.

FIG. 3 illustrates a typical program screen display 301 in an Internet operating session. The screen generally includes a mode row 303 which displays several different modes which the user may select such as the "Bookmarks" selection 304. As is generally known, the "Bookmark" selection, which is also referred to as "Favorites" or "Channels" in some browser applications, will cause a display of site addresses previously designated and entered by a user for future reference and quick access. The user may select one of the listed "bookmarks" and the program will immediately access the selected bookmark site. Another row 305 may be displayed to help a user quickly move through a documents, sites, or pages in a network application. An address or "location" section 307 enables a user to key-in, and also displays the name of, an internet address of a site to be, or being, visited. Other quick access buttons may be implemented on the screen for quick access to other selected network services and/or network functions such as "What's New" or "Net Search". In general, any of the illustrated items may be selected through a "point and click" methodology associated with the mouse device 215, and a cursor or pointer indicium visible on the display screen. For example, a download of data from a remote site may be immediately terminated during the transmission by pointing to the "Stop" button and clicking on a designated mouse button. Similarly, the "Back" and "Forward" buttons may be used to return to the last screen display or go forward to the next screen display, respectively.

Although the disclosed methodology is applicable to "text-only", "hyperlink-only" and other retrieval modes for retrieving selected types of items typically presented on a web page, the present example illustrates the hyperlink-only retrieval mode for retrieving items presented in a hyperlink type format i.e. a presentation type that allows a user to click on the text to retrieve a referenced page or go to a referenced site. In text-only mode, the disclosed methodology could be applied to selectively retrieve text-only skeleton pages without hyperlinks.

In FIG. 3, the "location" or Uniform Resource Locator ("URL") designation in the example is "Targetpage#3.com". Also shown is an exemplary page of "hypertext" which includes a page or more of text 309 including a plurality of "hyperlinks" such as hyperlinks 311 and 315. The hyperlinks are typically set out in bold type and underscored, and often displayed in a contrasting color for easy recognition. The hyperlinks typically comprise a grouping of descriptive words which if selected by a user through the positioning and clicking of a pointer 315 for example, will access the page or site which is designated by the link. The hyperlinks activate an access program to the selected site, unlike the remaining text on the page which merely represents text only without an functional aspect. For example, hyperlink 311 will access a web site through "link #4" and hyperlink 313 will access a web site through "link#12" as illustrated. Through the use of hyperlinks, a user may relatively quickly identify a possible site of interest and click on the hyperlink to immediately access that site from the current page. As can be seen in FIG. 3 however, only one screen is shown and a user may prematurely click on one of the visible links on the first page of a site when a more relevant hyperlink may appear on the next page. If the user clicked on the first visible hyperlink and then discovered it was not really what the user wanted, the user would then have to go back or reload the previous page that included all of the hyperlinks, and page down until a more appropriate hyperlink was identified.

Figure 4:
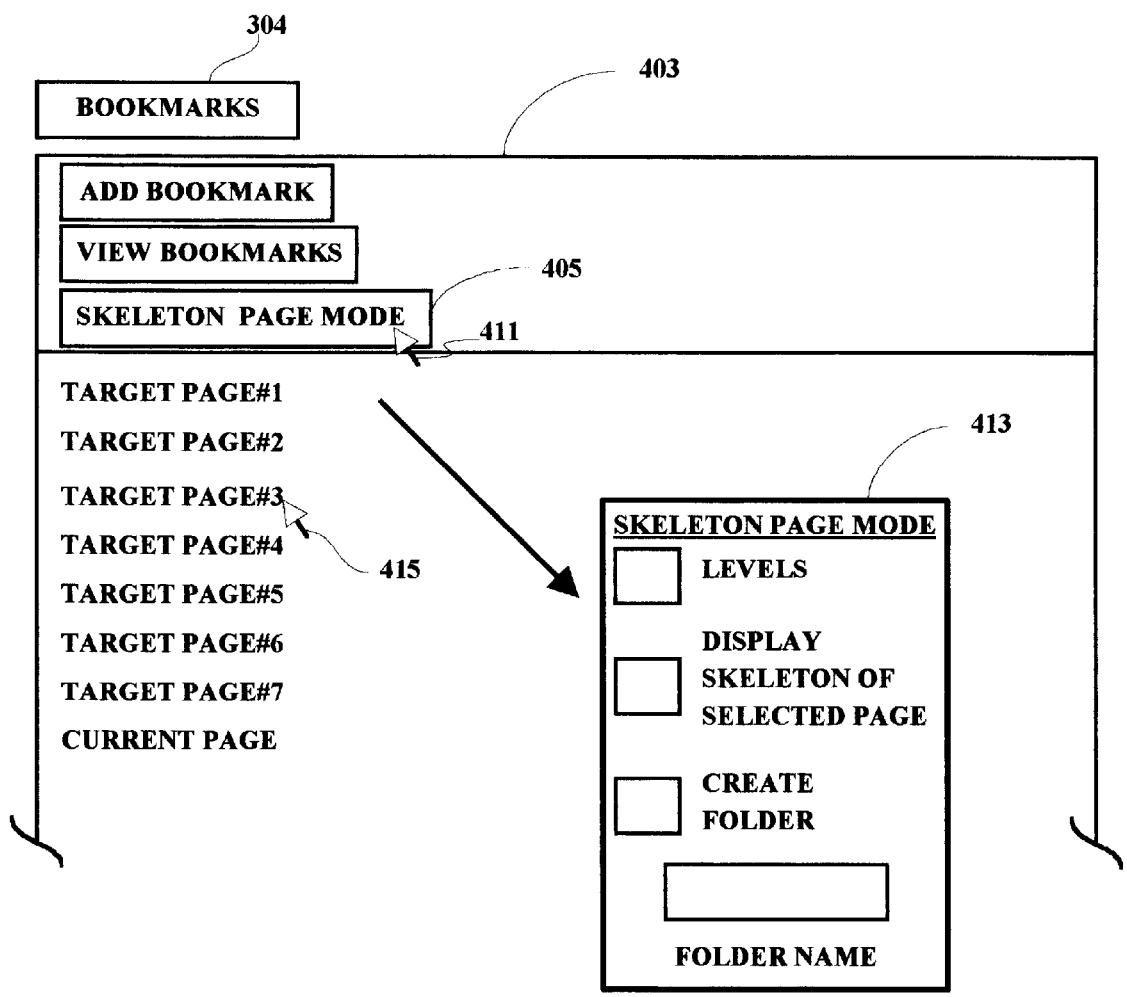
FIG. 4 is an illustration of an exemplary selection screen used in one embodiment of the present invention.

As shown in FIG. 4, several of the displayed items on the display screen 301, if selected, will open up a sub-menu from which a user may make another selection. For example, when the "Bookmark" selection 304 is clicked on from the screen 301, a "pop-up" sub-menu would be presented to the user. The sub-menu, in the present example, includes a plurality of selections such as "ADD BOOKMARK", and "VIEW BOOKMARK" which are typically included in the bookmark function. The "ADD BOOKMARK" selection may be made to add a current page to a bookmark list for future reference and the "VIEW BOOKMARK" selection may be made in order to view all of the bookmarks in the user's bookmark listing. In the illustration, several new selections have been added to the basic bookmark sub-menu in order to illustrate an exemplary implementation of the present invention. It should be understood however, that the added items, may be displayed in a different format or context, or even on a different sub-menu, to provide the added advantages to the user which the present invention enables. The present example including the selections added to the bookmark sub-menu, are used merely as an expedient and convenient environment in which to illustrate the usefulness of the methodology of the present invention.

As illustrated in FIG. 4, a new selection entitled "SKELETON PAGE MODE" 405 has been added. After a user clicks on the "Bookmark" function 304, a sub-menu 403 as shown will be displayed. The display in the present example will include all of the bookmarks previously designated and entered by the user into this file, including TARGET PAGE#1 through TARGET PAGE#7 as shown, and also the "Current Page" from which the Bookmark menu was selected. Typically, when a user is doing a search or just "surfing the net", the user will either enter a desired address into the location block of the main menu or the user may click on the bookmark menu to show sites previously visited and marked. If the user is already at a site from which the user wishes to "surf", the user would typically click on one of the designated pages to visit that site. The user would then wait for the selected site page and all of the inherent graphics, hypertext and text to be downloaded and displayed before the user could read the downloaded page or pages to determine if there are other sites identified by hyperlinks on the downloaded page or pages which the user may wish to visit next.

In accordance with the present invention however, as illustrated, a user may choose to select a "SKELETON PAGE MODE" 405 by pointing and clicking the pointer at location 411. The user may also select a "TARGET PAGE" from which to start the function by pointing and clicking the pointer at location 415 for "TARGET PAGE#3" for example. The selection of the starting page may be implemented in any of many convenient protocols. For example, if the Skeleton Page Mode is selected prior to the selection of a listed PAGE, the user may either be prompted to select a starting PAGE or the program could use the CURRENT PAGE as a default selection.

Upon activation of the skeleton page mode 405, a "pop-up" menu of skeleton page sub-menu 413 would be displayed for the user to make further selections in the present example. The boxes shown in the submenu may contain icons such that the indicated functions may be selected by "clicking on" either icons within the boxes or the corresponding text areas. After selecting a starting page to start the search for hyperlinks from, a user may enter or otherwise select the level to which the search would extend, and hit the "DISPLAY SKELETON OF SELECTED PAGE" button to initiate the assembly of only the hyperlinks, and the display or listing of only the hyperlinks on the selected page and referenced pages to the selected level of referenced pages. A user may also select to create a folder from the submenu 413 and input a selected name for the folder as indicated. The folder would create a reference in the listing of bookmarks, for example, or elsewhere, for the assembled skeleton page of hyperlinks specified by the user so that the user may subsequently go directly to the skeleton page from the bookmark listing. Alternatively, the skeleton page folders may be listed elsewhere in the main menu or other menu area for subsequent access, and may be stored by time of creation geographic area or other convenient reference.

When the user is ready to initiate the skeleton page function, the user may create the skeleton page of hyperlink-only listings by pointing and clicking on the "DISPLAY SKELETON" selection in the submenu 413. If no "LEVEL" selection has been made, the program, in the present example, will use a default value of "1" level. The designation of "1" level means that the program will peruse only one level of hyperlinks to assemble a skeleton page listing of hyperlinks, i.e. only the hyperlinks found on the first designated page or Page#3 in the example, will be assembled and listed or displayed on a skeleton page to the user.

One of many possible pseudocode listings which could be implemented to practice the present invention is hereinafter presented.

```
Process_page(url, level, skeleton)
{
    retrieve page specified by url;
    locate_hyperlinks_in_page(url);
        for each hyperlink in page do {
```

```
        add link to hierarchical skeleton listing;
        if (level_to_fetch>1) process_page(hyperlink, level-
            1,skeleton;
    }
    return skeleton listing page;
}
locate_hyperlinks_in_page(url)
{
    while there is more text in url page
        search for html link;
        add html link;
    end while
    return links;
{
```

It is noted that if a link points to, for example, a sound file, or files that are not likely to contain additional hyperlinks, it is not processed further because it is not going to return higher level links. The user may also manually indicate which types of links are not to be pursued further. For example some users may not care to look into VRML files, while other users may have no interest in other types of nodes.

Figure 5:
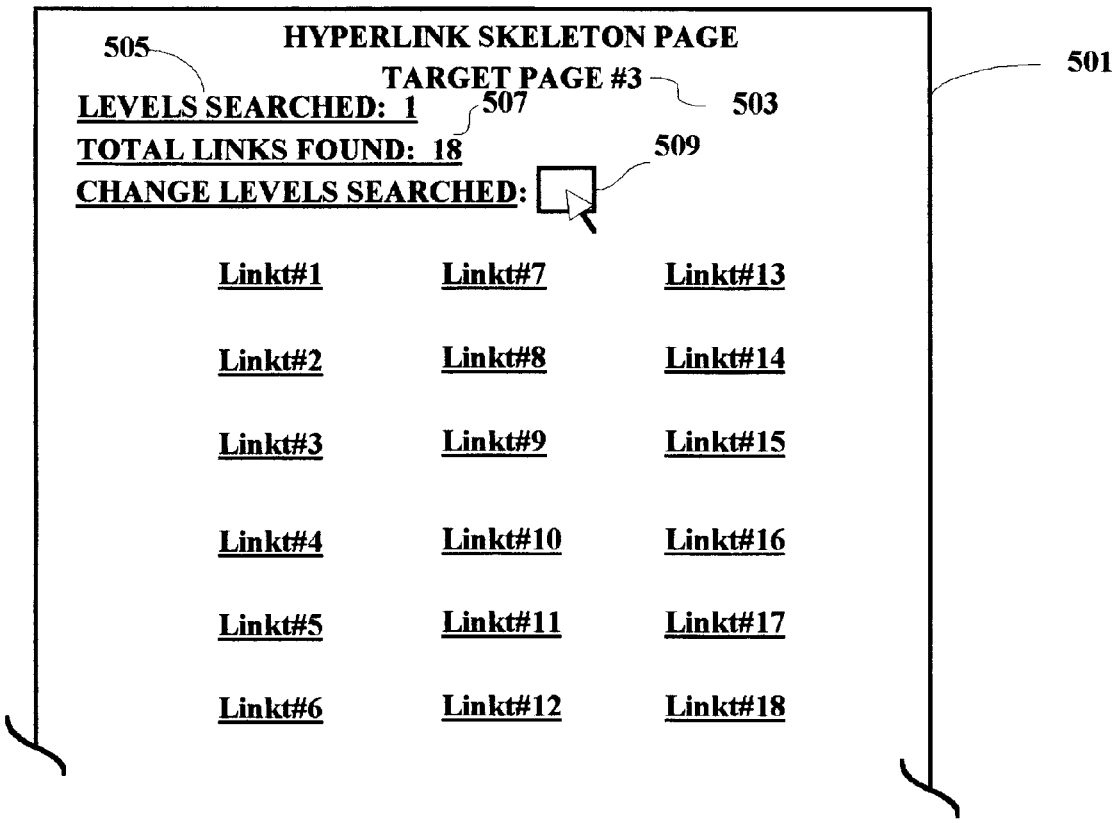
FIG. 5 is an illustration of an exemplary hyperlink listing screen useful in one implementation of the present invention.

An exemplary skeleton page showing a listing of hyperlinks is illustrated in FIG. 5. It should be noted that the listing may be further processed and organized in any of many useful formats without departing from the scope of the present invention. Further, when more than one level is selected for the skeleton page function, the returned skeleton page listing of hyperlinks 501 may also be organized in any useful format including being listed by site name, page number and level number. As shown in FIG. 5, the skeleton page 501 includes an identification of the target page or base page number 503, the number of levels searched 505, the total number of links found 507, and a listing of the particular links found, i.e. Link#1 through Link#18 in the example. Also included in the example is a designated screen area 509 which may be used to insert a different level number in the event that the initial level number for the initial hyperlink search provided too many or too few hyperlink listings. It is noted that the hyperlink listing display 501 in the skeleton mode will be returned to the user much faster than a typical return of an actual web page which would contain all associated graphics and non-functional text and only a few of the hyperlinks listed in FIG. 5. From the FIG. 5 screen, a user may quickly focus in on the more precise hyperlinks and access those links directly from the more inclusive skeleton page or hyperlink listing 501. In addition, a user may select the bookmark menu once again to save the skeleton page or hyperlink listing itself 501 in the bookmark file as hereinbefore noted.

Figure 6:
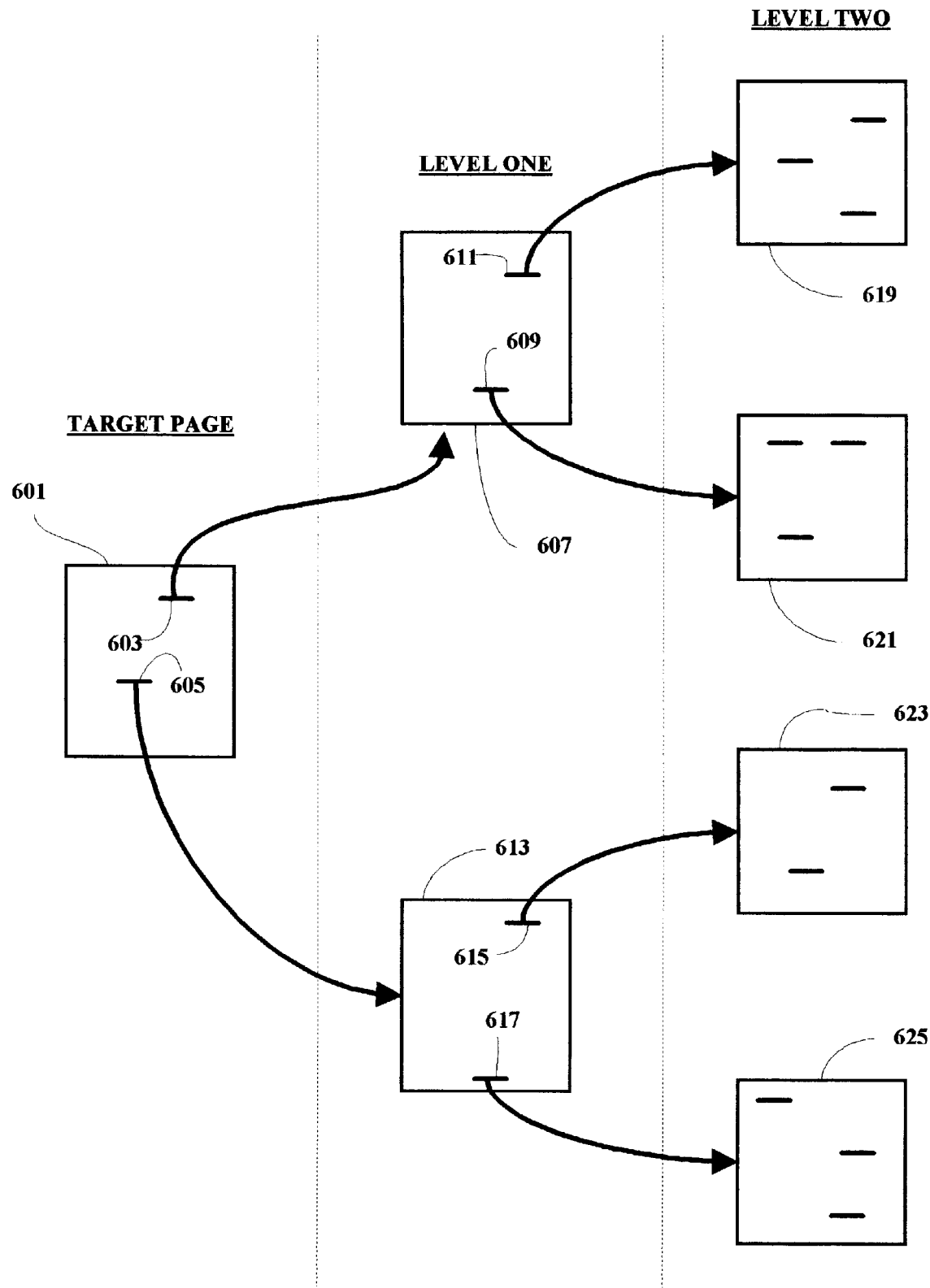
FIG. 6 is a simplified schematic illustration of a hyperlink tree structure within an internet system.

The FIG. 6 illustration shows the tree structure through which the skeleton page or hyperlink listing function navigates in assembling the skeleton page hyperlink listing shown in FIG. 5. From the target page 601, which may contain two hyperlinks 603 and 605, the program would assemble hyperlinks 609 and 611 from pages 607, and hyperlinks 615 and 617 from page 613 if only one level were designated. If the number "2" was designated as the hyperlink level designation by a user, then the program would also return the hyperlinks listed on the next level of pages, i.e. pages 619, 621, 623 and 625.

Figure 7:
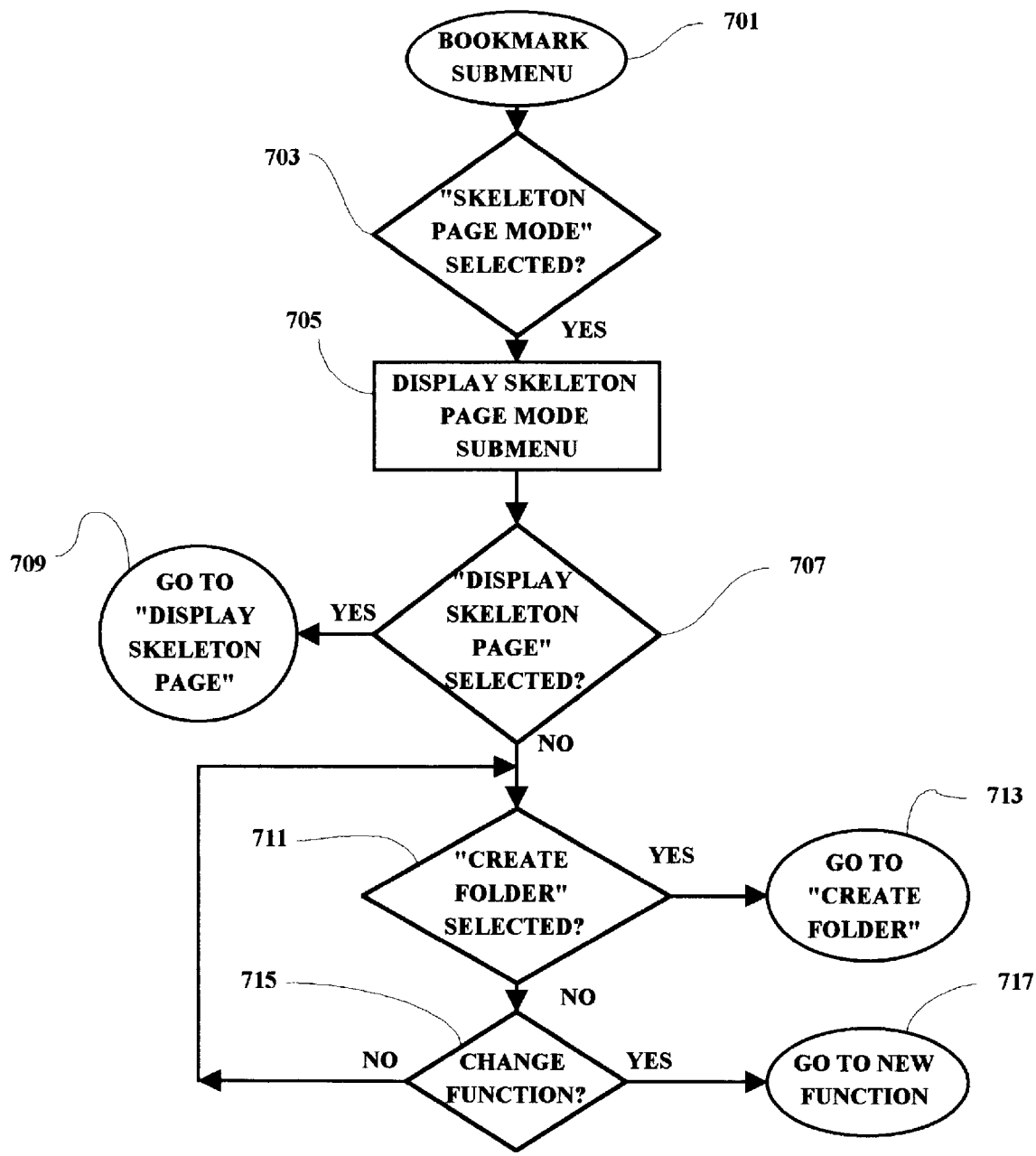
FIG. 7 is a flowchart illustrating several optional selections within the network methodology disclosed.
Figure 8:
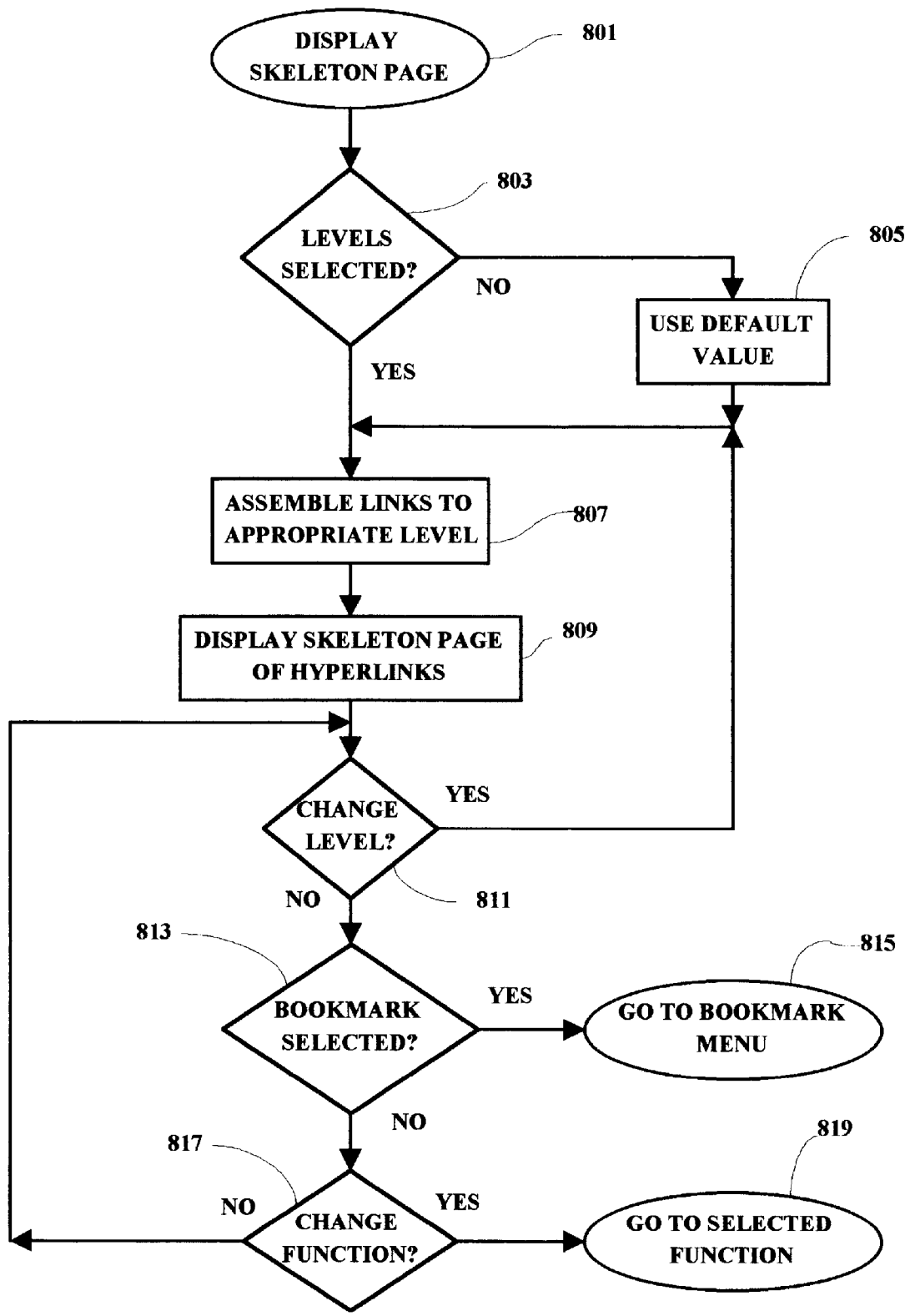
FIG. 8 is a flowchart illustrating an exemplary operational sequence in one application of the present invention.

As shown in FIG. 7, in the illustrated example, when the "bookmarks" item 304 is selected by a user, a bookmark sub-menu 403 is presented or displayed. At that point, a user may select one of three choices. The choices include the selection of a "SKELETON PAGE MODE" 405, the selection of an "ADD BOOKMARK" function to add a new bookmark, or the selection of a "VIEW BOOKMARK" function to view the existing listed bookmarks. As hereinbefore noted, the "Add Bookmark" selection adds a current page to the bookmark file and ends by closing the sub-menu. The "View Bookmark" selection initiates a view bookmark function which displays a list of the existing bookmarked files for viewing and further action by the user. When the "SKELETON PAGE MODE" function 405 is selected from the bookmark submenu 701, the program determines that the Skeleton Page Mode has been selected 703, and effects a display 705 of a Skeleton Page Mode submenu 413. Next, if the "DISPLAY SKELETON PAGE" selection 417 has been clicked 707 by the user, the program will continue 709 as illustrated in FIG. 8. Otherwise, when a "CREATE FOLDER" selection has been made 711, the program will execute a corresponding routine 713 to create a folder with the selected skeleton page as hereinbefore discussed. The user may also elect to change functions 715 by clicking on the background screen and selecting a different function 717 from one of the main menu items for example.

In FIG. 8, when the "DISPLAY SKELETON PAGE" item has been selected 801, a determination is made as to the number of levels desired to be searched 803 for the creation of the skeleton or hyperlink listing page. If no specific number has been designated by the user, a default level 805 of, for example, "1" may be used. The program will then assemble all of the hyperlinks present on the designated target pages down through the number of levels designated 807 and display the skeleton page with a listing of the hyperlinks 809 in any one of many available formats or organizations chosen. A user may then, for example, initiate another skeleton page creation function by changing the search level number selected 811 if the returned listing included too many or too few hyperlinks. From the skeleton or hyperlink listing display, the user may also again select "Bookmark" 813 and return to the bookmark menu 815, or change selected functions entirely 817 and go to the selected new function 819.

Hyperlinks are easily identified for assembly and display on skeleton pages. For example, in HTML (hypertext markup language), hyperlinks can be identified from a source code listing of the source code used in creating a web page. In the source code listing, the hyperlinks are marked by a designation "href". This designation can be observed from a source code listing available at the server site by clicking on "VIEW" from a webpage menu and then clicking on "SOURCE" from the submenu. The "href" code segments which create the hyperlinks on the web page can also be used in creating the hyperlink listing on a skeleton page display.

The method and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely in program code stored on a disk or diskette (portable or fixed), or other memory device, from which it may be executed to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for enabling a computer terminal user to locate material on network pages related to a subject being perused on a network, said network pages including a plurality of different types of displayed items in a plurality of formats, said method comprising:

presenting a selection screen to the user whereby the user may make a selection to provide a skeleton listing of only designated types of displayed items;

displaying said skeleton listing to the user in response to an appropriate selection by the user, wherein said skeleton listing of designated types of displayed items comprises a listing of hyperlinks present on at least one selected network page; and enabling a user to select a level value representative of a level of linked pages to be perused in providing said listing of hyperlinks.

2. The method as set forth in claim 1 wherein said listing of hyperlinks comprises hyperlinks present on said designated network page listed separately from and exclusive of the context displayed on said designated network page.

3. The method as set forth in claim 1 and further including:

enabling a user to change said selected level value to a new value after said display of said hyperlinks;

assembling a new set of hyperlinks in accordance with said changed level value; and displaying a new listing of hyperlinks to the user based upon a changed level value.

4. A method for enabling a computer terminal user to locate material on network pages related to a subject being perused on a network, said network pages including a plurality of different types of displayed items in a plurality of formats, said method comprising:

presenting a selection screen to the user whereby the user may make a selection to provide a skeleton listing of only designated types of displayed items;

displaying said skeleton listing to the user in response to an appropriate selection by the user, wherein said skeleton listing of designated types of displayed items comprises a listing of hyperlinks present on at least one selected network page;

enabling the user to select at least one of said displayed hyperlinks for activation;

enabling a user to select a level value representative of a level of linked pages to be perused in providing said listing of hyperlinks; and retrieving a network page associated with a selected one of said displayed hyperlinks.

5. The method as set forth in claim 4 and further including:

enabling a user to change said selected level value to a new value after said display of said hyperlinks;

assembling a new set of hyperlinks in accordance with said changed level value; and displaying a new listing of hyperlinks to the user based upon a changed level value.

6. A storage medium including machine readable indicia, said storage medium being selectively coupled to a reading device, said reading device being selectively coupled to processing circuitry within a computer system, said reading device being selectively operable to read said machine readable indicia and provide program signals representative thereof, said program signals being effective to cause said computer system to selectively provide a listing of hyperlinks assembled from a designated network page, said program signals being selectively operable to effect an accomplishment of the steps of:

presenting a selection screen to the user whereby the user may make a selection to provide a listing of hyperlinks included on at least one designated network page;

enabling a user to select a level value representative of a level of linked pages to be perused in providing said listing of hyperlinks; and displaying said listing of hyperlinks to the user.

7. The storage medium as set forth in claim 6 wherein said listing of hyperlinks comprises hyperlinks present on said designated network page listed separately from, and exclusive of, the context displayed on said designated network page.

8. The storage medium as set forth in claim 6 wherein said steps further include:

enabling a user to change said selected level value to a new value after said display of said hyperlinks;

assembling a new set of hyperlinks in accordance with said changed level value; and displaying a new listing of hyperlinks to the user based upon a changed level value.

9. A storage medium including machine readable indicia, said storage medium being selectively coupled to a reading device, said reading device being selectively coupled to processing circuitry within a computer system, said reading device being selectively operable to read said machine readable indicia and provide program signals representative thereof, said program signals being effective to cause said computer system to selectively provide a listing of hyperlinks assembled from a designated network page, said program signals being selectively operable to effect an accomplishment of the steps of:

presenting a selection screen to the user whereby the user may make a selection to provide a listing of hyperlinks included on at least one designated network page;

displaying said listing of hyperlinks to the user;

enabling the user to select at least one of said displayed hyperlinks for activation;

enabling a user to select a level value representative of a level of linked pages to be perused in providing said listing of hyperlinks; and retrieving a network page associated with a selected one of said displayed hyperlinks.

10. The storage medium as set forth in claim 9 wherein said steps further include:

enabling a user to change said selected level value to a new value after said display of said hyperlinks;

assembling a new set of hyperlinks in accordance with said changed level value; and displaying a new listing of hyperlinks to the user based upon a changed level value.

* * * * *